Nov. 18, 1958   B. R. BETTER ET AL   2,860,883
QUICK CHANGE CHUCK
Filed Nov. 8, 1956
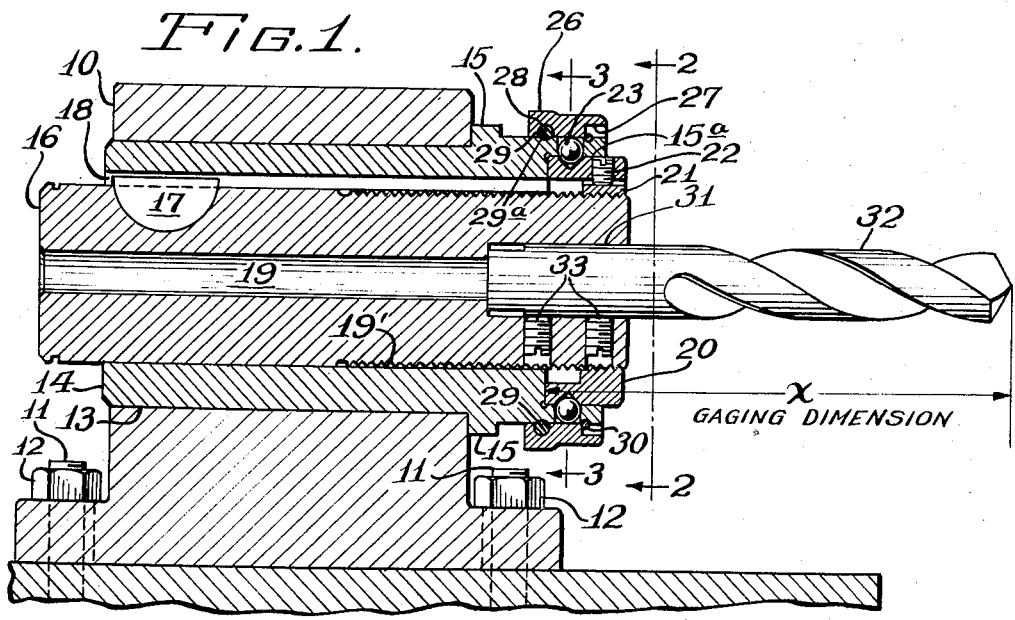
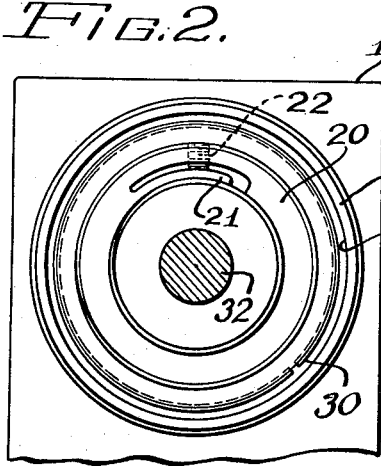
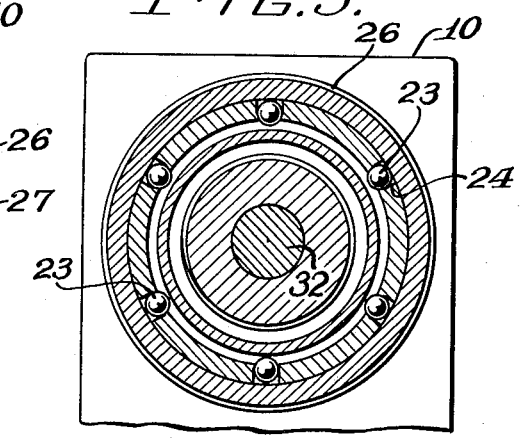
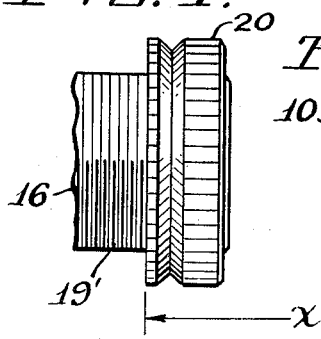
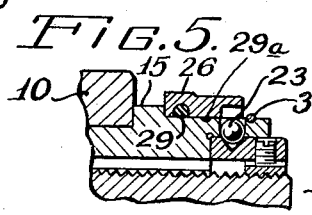
Inventors:
Bernard R. Better
Harry Conn
By Glenn S. Noble
Atty.

2,860,883

QUICK CHANGE CHUCK

Bernard R. Better and Harry Conn, Chicago, Ill., assignors to Seally-Jones and Company, Chicago, Ill., a corporation of Illinois Application November 8, 1956, Serial No. 621,067

4 Claims. (Cl. 279—83)

This invention relates to chucks or tool holding devices which are particularly adapted for use with multiple spindle machines or machines in which pre-setting of the tools is desired.

The objects of the invention are to provide an adapter or collet with a tool therein which may be pre-set outside of the chuck or machine to any desired distance. In the particular form of the invention, this distance will be measured from the cutting edge or end of the tool to the back side of an adjusting nut carried by the collet.

Another object is the arrangement whereby the adapter or collet may be inserted in the chuck to varying depths and at the same time have a positive or rigid back-up due to a lock nut which is fastened to the collet and serves as a thrust collar.

Another object is to provide means whereby the collet and tool carried thereby may be quickly removed from the chuck or holder and also quickly inserted therein.

Other advantages and improvements will appear more fully from the following description taken in connection with the accompanying drawings in which, Fig. 1 is a longitudinal sectional view of the chuck with the parts mounted therein.

Fig. 2 is an end view taken substantially on the line 2—2 of Fig. 1.

Fig. 3 is a sectional view taken on the line 3—3 of Fig. 1.

Fig. 4 is a detail of the lock nut mounted on the collet.

Fig. 5 is a view showing the adjusting collar in position for removing the collet from the chuck; and Fig. 6 is a detail showing one of the locking or fastening balls for fastening the collet and parts in position.

As shown in these drawings, 10 represents a block or tool supporting part of a machine tool which may be fastened to the machine by means of bolts 11 and nuts 12 in the usual manner. The block has a cylindrical opening 13 for receiving a chuck body or cylinder 14. The chuck body or cylinder fits closely in the opening and is provided with an annular flange 15 which engages the end of the block as shown in Fig. 1. The chuck body extends forwardly and is provided at its outer end with an annular recess 15a.

The collet or adjustable adapter 16 is slidably mounted in the body 14 and is held by means of a Woodruff key 17 which engages with a key-way 18 in the chuck body 14. The collet 16 is preferably provided with a central hole 19 for removal of tools which may become stuck in the collet, and for coolant passage.

The collet 16 is threaded for a considerable distance as shown at 19' for engagement with a lock nut 20 of peculiar construction as shown. This nut fits in the recess 15a in the end of the body 14, and engages with the shoulder at the end of the recess. The lock nut 20 is provided on its threaded inner surface with a circular tongue 21 which may be urged against the threads of the collet by means of set screw 22, the arrangement being such that the lock nut will be held securely in position and yet may be readily released for adjusting purposes.

The lock nut and parts associated therewith are held in position longitudinally of the body by means of a plurality of balls 23 as shown in Figs. 1, 3 and 6. These balls are mounted in openings 24 in the flange-like portion at the end of the body and are prevented from falling out or moving inwardly by having the ends of the holes flanged inwardly as shown at 25 in Fig. 6.

The balls are held in engaging position by means of a collar 26 which slidably engages the outer end of the body portion 14, and also engages the shoulder formed by the flange 15 when in retracted position. The collar 26 extends from the shoulder 15 to a point adjacent to the outer portions of the openings 24 and over the balls 23. It has an annular enlargement or recess 27 at its outer end. The collar has a groove 28 for receiving a resilient O-ring 29 which provides friction against the body for holding the collar in adjusted position. The body also has a groove 29a adjacent to the outer end of receiving the O-ring and holding the collar in projected position.

When the collet is to be removed from the holder, the collar 26 is moved inwardly as shown in Fig. 5 until the enlarged opening is opposite the balls 23. Then by pulling out on the lock nut, the balls will be forced outwardly and will permit the lock nut and parts connected therewith to be removed from the chuck. A spring ring 30 prevents the collar from being accidentally removed. When the collet and lock nut are again inserted in the body, the balls will be pressed outwardly sufficient to enter the groove in the lock nut and the parts are fastened together by moving the collar outwardly as shown in Fig. 1 to operating position.

In the form, the collet is provided at its outer end with hole 31 for receiving the shank of a straight shank drill 32 or other tool to be driven by the chuck. The drill is held in the socket by means of set screws 33 and abuts against the bottom of the hole to make a rigid connection.

The predetermined distance for pre-setting a tool would be from the outer end of the tool to the inner face of the adjusting nut as indicated at X in Fig. 1. This being known as the gaging dimension for the tool whereby the tools may be set and then inerted in the machine.

From this description, it will be seen that we provide a chuck and mounting means of simple construction whereby no special tools or wrenches are needed to insert or remove the tools from the machines and we have shown by actual practice that our chucks provide the advantages above set forth.

What we claim is:

1. A quick change chuck including a supporting block adapted to be secured to a machine tool and having a cylindrical hole therethrough, a cylindrical chuck body fitting in said hole and having an annular flange engaging with one end of the block, a collet mounted in the body and having a Woodruff key connection with the body for permitting the collet to move longitudinally and preventing its turning in the body, said collet having threads at the outer portion thereof, a lock nut engaging with said threads and fitting in an annular recess in the end of the body, said lock nut having an annular groove, holes in the end of the body which project over the lock nut, balls fixed in said holes and engaging with said groove, and a collar slidably mounted on the end of the chuck body and adapted to engage with the flange, said collar having an inner annular groove, a resilient O-ring mounted in the groove and engaging with the surface of the adjacent portion of the body, said portion also having a groove for receiving the O-ring to hold the collar in adjusted position, the collar having an annular enlarged opening at its outer end, the arrangement being that when the collar is in projected position, it will hold the balls in engagement with the lock nut and when the collar is in retracted position, the balls may move outwardly and permit the nut and parts connected therewith to be withdrawn from the chuck body.

2. The combination with a chuck body adapted to be mounted in a machine tool and having a cylindrical opening therethrough and an annular flange spaced from one end, said body having a longitudinal key way, a collet slidably mounted in the body and having a key engaging with said key way, said collet being threaded, a lock nut engaging with said threads and having an annular peripheral groove, the chuck body having an enlarged opening for receiving the nut which fits closely therein and providing a flange end fitting over the nut, radial holes in said end in alignment with the groove in the nut, balls in said holes for engagement with the groove, a locking collar slidably mounted on the end of the body and adapted to engage with said flange, said locking collar having an enlarged opening at its outer end for receiving the balls which may be partially projected into said opening when the lock nut is moved outwardly, said locking collar also fitting over the balls when in fastening position, an O-ring in the locking collar which engages with the adjacent surface of the body, and a spring ring in the body to hold the collar on the body, said collet being adapted to receive a working tool.

3. In a device of the character set forth, the combination of a threaded collet having a central longitudinal hole therethrough, a lock nut for engagement with said collet having a peripheral groove therein, a chuck body in which the collet is mounted for longitudinal movement, interengaging means between the collet and the chuck body preventing relative rotation therebetween, the chuck body having a recess in the end thereof for receiving said lock nut and having a plurality of radial holes registering with the peripheral groove, balls in said holes, flanges at the inner ends of the holes for holding the balls in the respective holes, means for fastening the balls in engagement with the peripheral groove when the device is in operation and for releasing the balls from the peripheral groove to permit removal of the lock nut and parts connected therewith, said means consisting of a locking collar slidably mounted on the end of the body, a spring ring for holding the collar in position, said locking collar having an enlarged annular opening in its outer end for receiving the balls which may be projected into said opening when the lock nut is moved outwardly, said locking collar also fitting closely over the balls when in fastening position, and an O-ring engaging with the body and also with a groove in the collar for holding the collar in adjusted positions.

4. In a device as per claim 3, a lock nut having an inner peripheral tongue for engagement with the threads of the part to which the nut is applied, a set screw for urging the tongue inwardly, and a peripheral groove in the nut for the purposes described.

References Cited in the file of this patent

UNITED STATES PATENTS

| | | |
|---|---|---|
| 2,705,119 | Ingwer | Mar. 29, 1955 |
| 2,709,600 | Lehde | May 31, 1955 |